(12) United States Patent
Wang

(10) Patent No.: US 9,374,863 B2
(45) Date of Patent: Jun. 21, 2016

(54) AC LED LAMPS AND CONTROL METHODS THEREOF

(71) Applicant: Analog Integrations Corporation, Hsin-Chu (TW)

(72) Inventor: Jing-Chyi Wang, Hsin-Chu (TW)

(73) Assignee: Analog Integrations Corporation, Science Park, Hsin-Chu (TW)

( * ) Notice: Subject to any disclaimer, the term of this patent is extended or adjusted under 35 U.S.C. 154(b) by 103 days.

(21) Appl. No.: 14/487,072

(22) Filed: Sep. 15, 2014

(65) Prior Publication Data

US 2016/0081143 A1    Mar. 17, 2016

(51) Int. Cl.
*H05B 39/02*    (2006.01)
*H05B 33/08*    (2006.01)

(52) U.S. Cl.
CPC .......... *H05B 33/083* (2013.01); *H05B 33/0815* (2013.01)

(58) Field of Classification Search
USPC .......... 315/185 R, 186, 192, 193, 200 R, 201, 315/205, 209 R, 210, 224, 226, 291, 294, 315/297, 299, 307, 311, 313, 312, 362
See application file for complete search history.

(56) References Cited

U.S. PATENT DOCUMENTS

2011/0084619 A1    4/2011   Gray
2012/0081009 A1    4/2012   Shteynberg
2014/0015430 A1    1/2014   Kurt
2014/0175996 A1*   6/2014   Yoon .................. H05B 33/0824
                                                                         315/191

FOREIGN PATENT DOCUMENTS

| CN | 102045923 A | 5/2011 |
|---|---|---|
| CN | 103338563 A | 10/2013 |
| JP | 2009123427 A | 6/2009 |
| JP | 201079377 A | 4/2010 |
| JP | 2014514752 A | 6/2014 |
| TW | 201306645 A1 | 2/2013 |
| TW | 201401920 A | 1/2014 |
| TW | 201422054 A | 6/2014 |

* cited by examiner

*Primary Examiner* — Douglas W Owens
*Assistant Examiner* — Jianzi Chen
(74) *Attorney, Agent, or Firm* — Winston Hsu; Scott Margo

(57) ABSTRACT

A LED lamp has LED groups, a path controller, a power bank, and a bank controller. The LED groups are arranged in series between a rectified input voltage and a ground voltage. The path controller controls path switches, each path switch for coupling a corresponding LED group to the ground voltage. The power bank is coupled between the rectified input voltage and the ground voltage, having a capacitor and a discharge switch. The capacitor is configured to be charged when the rectified input voltage exceeds a capacitor voltage of the capacitor. The discharge switch is connected between the capacitor and the rectified input voltage. The bank controller determines a connection period and controls the discharge switch in response to a signal turning ON one of path switches, in order to make the capacitor capable of being discharged to the rectified input voltage during the connection period.

17 Claims, 6 Drawing Sheets

AC LED LAMPS AND CONTROL METHODS THEREOF

BACKGROUND

The present disclosure relates generally to Light-Emitting Diode (LED) lamps, and more particularly to Alternating Current (AC) driven LED lamps and control methods thereof.

Light-Emitting Diodes or LEDs are increasingly being used for general lighting purposes. In one example, a set of LEDs is powered from an AC power source and the term "AC LED" is sometimes used to refer to such circuit. Concerns for AC LED include manufacture cost, power efficiency, power factor, flicker, lifespan, etc.

FIG. 1 demonstrates AC LED lamp 10 in the art, which, in view of electric circuit, simply has a LED module 12 and a current-limiting resistor 14. The LED module 12 consists of two LED strings connected in anti-parallel. The AC LED circuit 10 in FIG. 1 requires neither an AC-DC converter nor a rectifier. Even though a DC voltage is also compatible, an AC voltage is typically supplied to input port 8 and directly powers the AC LED circuit 10. Simplicity in structure and low-price in manufacture are two advantages the AC LED circuit 10 provides. Nevertheless, the AC LED circuit 10 can only emit light in a very narrow time period in each AC cycle time, suffering either low average luminance or high-current stress to LEDs.

FIG. 2 demonstrates another AC LED lamp 15 in the art. Examples of the AC LED lamp 15 can be found from U.S. Pat. No. 7,708,172. The AC LED lamp 15 employs full-wave rectifier 18. A DC or AC voltage source is received on input port 16. A string of LEDs are grouped into LED groups $20_1$, $20_2$, $20_3$, and $20_4$. An integrated circuit 22 has nodes $PIN_1$, $PIN_2$, $PIN_3$, and $PIN_4$, connected to the cathodes of LED groups $20_1$, $20_2$, $20_3$, and $20_4$ respectively. Inside integrated circuit 22 are path switches $SG_1$, $SG_2$, $SG_3$, and $SG_4$, and a path controller 24 as well. When the voltage on input port 16 increases, controller 24 can switch path switches $SG_1$, $SG_2$, $SG_3$, and $SG_4$, to possibly make more LEDs emit light. Operations of integrated circuit 22 have been exemplified in U.S. Pat. No. 7,708,172 and are omitted here for brevity.

FIG. 3 illustrates the waveforms of signals when the input port 16 in FIG. 2 is supplied with an AC sinusoidal input voltage. The upmost waveform shows a rectified input voltage $V_{REC}$, which, as indicated in FIG. 2, refers to the voltage the full-wave rectifier 18 provides to LED group $20_1$. The second waveform shows the total number of illuminating LEDs, meaning the number of LEDs that are illuminating. The four following waveforms regard with currents $I_{G4}$, $I_{G3}$, $I_{G2}$ and $I_{G1}$, which as shown in FIG. 2, refer to the currents flowing through LED groups $20_4$, $20_3$, $20_2$ and $20_1$, respectively. The total number of illuminating LEDs rises or descends stepwise, following the increase or decrease of the rectified input voltage $V_{REC}$. When the rectified input voltage $V_{REC}$ increases, LED groups $20_1$, $20_2$, $20_3$, and $20_4$, according to a forward sequence, join to illuminate. For example, when the rectified input voltage $V_{REC}$ increases to just exceed the threshold voltage $V_{TH1}$, the voltage required for driving the LED group $20_1$ to illuminate, the LED group $20_1$ starts illuminating. When the rectified voltage $V_{REC}$ decreases, LED groups $20_1$, $20_2$, $20_3$, and $20_4$ darken according to a backward sequence. If, for example, the rectified input voltage $V_{REC}$ just falls below the threshold voltage $V_{TH4}$, the voltage required for driving all the LED groups $20_1$, $20_2$, $20_3$ and $20_4$ to illuminate, then the path switch $SG_3$ is switched ON, such that the LED group $20_4$ stops illuminating, leaving only the LED groups $20_1$, $20_2$ and $20_3$ to emit light. The AC LED lamp 15 enjoys simple circuit architecture and, as can be derived, good power efficiency.

There in FIG. 3 however has a dark period $T_{DARK}$ when no LED illuminate, because the rectified voltage $V_{REC}$ is too low to drive the LED group $20_1$. If the rectified voltage $V_{REC}$ is a 120-Hertz signal, the voltage valley, where the rectified voltage $V_{REC}$ is about zero Volt, appears at 120 Hz, causing the dark period $T_{DARK}$ to show up in the same frequency of 120 Hz. Even though the dark period $T_{DARK}$ at 120 Hertz might not be perceivable by human eyes, reports indicate that when a digital camera takes a photograph of an object exposed under the luminance of the LED lamp 15, the photograph comes out with unwelcome dark lines due to the existence of the dark period $T_{DARK}$. It is appreciated for an LED lamp to introduce no dark period $T_{DARK}$.

BRIEF DESCRIPTION OF THE DRAWINGS

The invention can be more fully understood by the subsequent detailed description and examples with references made to the accompanying drawings, wherein.

DETAILED DESCRIPTION

The following embodiments are described in sufficient detail to enable those skilled in the art to make and use the invention. It is to be understood that other embodiments would be evident based on the present disclosure, and that improves or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known configurations and process steps are not disclosed in detail.

Figure 4:
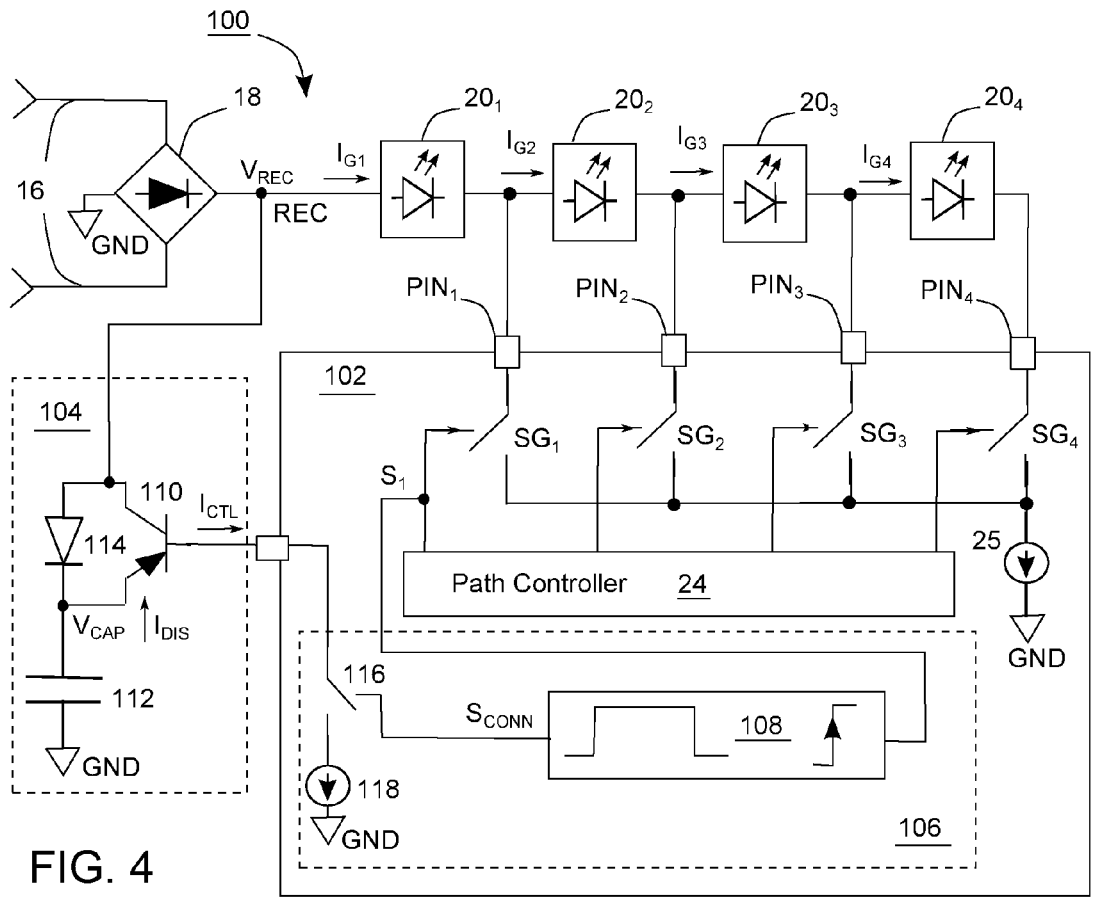
FIG. 4 demonstrates an AC LED lamp according to embodiments of the invention.

FIG. 4 demonstrates an AC LED lamp 100 according to embodiments of the invention. The AC LED lamp 100 has a full-wave rectifier 18 to rectify a sinusoid input voltage $V_{AC}$ at an input port 16, and provides a rectified input voltage $V_{REC}$ at node REC and a ground voltage at GND node. The LED groups $20_1$, $20_2$, $20_3$ and $20_4$ form a LED string and are connected in series between the rectified input voltage $V_{REC}$ and the ground voltage. Each LED group might consist of several LEDs connected in parallel or in series, depending on its application. The LED group $20_1$ is the most upstream LED group in FIG. 4 as its anode is connected to the highest voltage in the LED string, the rectified input voltage $V_{REC}$. Analogously, the LED group $20_4$ is the most downstream LED group in FIG. 4.

An integrated circuit 102 has path switches $SG_1$, $SG_2$, $SG_3$ and $SG_4$, a path controller 24, and a bank controller 106. Each of path switches $SG_1$, $SG_2$, $SG_3$ and $SG_4$ connects one cathode of an LED group to a current source 25, which limits the maximum driving current from the LED string to the ground voltage. For example, the path switch $SG_1$ controls the connection between the cathode of the LED group $20_1$ and the current source 25. The path controller 24 is configured to control the path switches $SG_1$, $SG_2$, $SG_3$ and $SG_4$. For example, if the rectified input voltage $V_{REC}$ is so low that the current $I_{G4}$ passing through the LED group $20_4$ is about 0 A, then the path controller 24 turns on the path switch $SG_3$, coupling the cathode of the LED group $20_3$ directly to the current source 25.

The AC LED lamp 100 includes a power bank 104 coupled between the rectified input voltage $V_{REC}$ and the ground voltage. The power bank stores electric energy when the absolute value of the sinusoid input voltage $V_{AC}$ is relatively high, and releases its stored energy to the LED string when the absolute value of the sinusoid input voltage $V_{AC}$ is relatively low. The power bank 104 has a diode 114 connected between the node REC and the capacitor 112. As a result, when the rectified input voltage $V_{REC}$ exceeds the capacitor voltage $V_{CAP}$ of the capacitor 112, a current conducted through the diode 114 charges the capacitor 112, and the capacitor voltage $V_{CAP}$ increases. A PNP BJT 110 acts as a discharge switch, connected between the rectified input voltage $V_{REC}$ and the capacitor 112. When there is a non-zero control current $I_{CTL}$ draining from the base of the BJT 110, and the capacitor voltage $V_{CAP}$ is higher than the rectified input voltage $V_{REC}$, then the BJT can conduct a charge current $I_{DIS}$ from the capacitor 112 to the node REC, powering the LED string. In other words, the BJT 110 can be turned ON by the control current $I_{CTL}$, and then the energy stored in the capacitor 112 could be released to illuminate one of the LED groups $20_1$, $20_2$, $20_3$ and $20_4$. As to when the control current $I_{CTL}$ starts and how much the control current $I_{CTL}$ is, it is up to the control of the bank controller 106 inside the integrated circuit 102.

In FIG. 4, the bank controller 106 has a pulse generator 108, a switch 116 and a constant current source 118. The pulse generator 108 is configured to response to signal $S_1$, which the path controller 24 sends to control the path switch $SG_1$, the most upstream path switch among all the path switches. When the signal $S_1$ is asserted to turn on the path switch $SG_1$, the pulse generator 108 is triggered to output a pulse $S_{CONN}$ with a predetermined pulse width. The pulse $S_{CONN}$ turns on the switch 116 such that the constant current source 118 conducts the control current $I_{CTL}$ from the base of the BJT 110. The pulse generator 108 determines the pulse width of the pulse $S_{CONN}$, referred to as a connection period $T_{CONN}$ in this specification because the BJT 110 seemingly connects the capacitor 112 to the node REC when the pulse $S_{CONN}$ appears.

Figure 5:
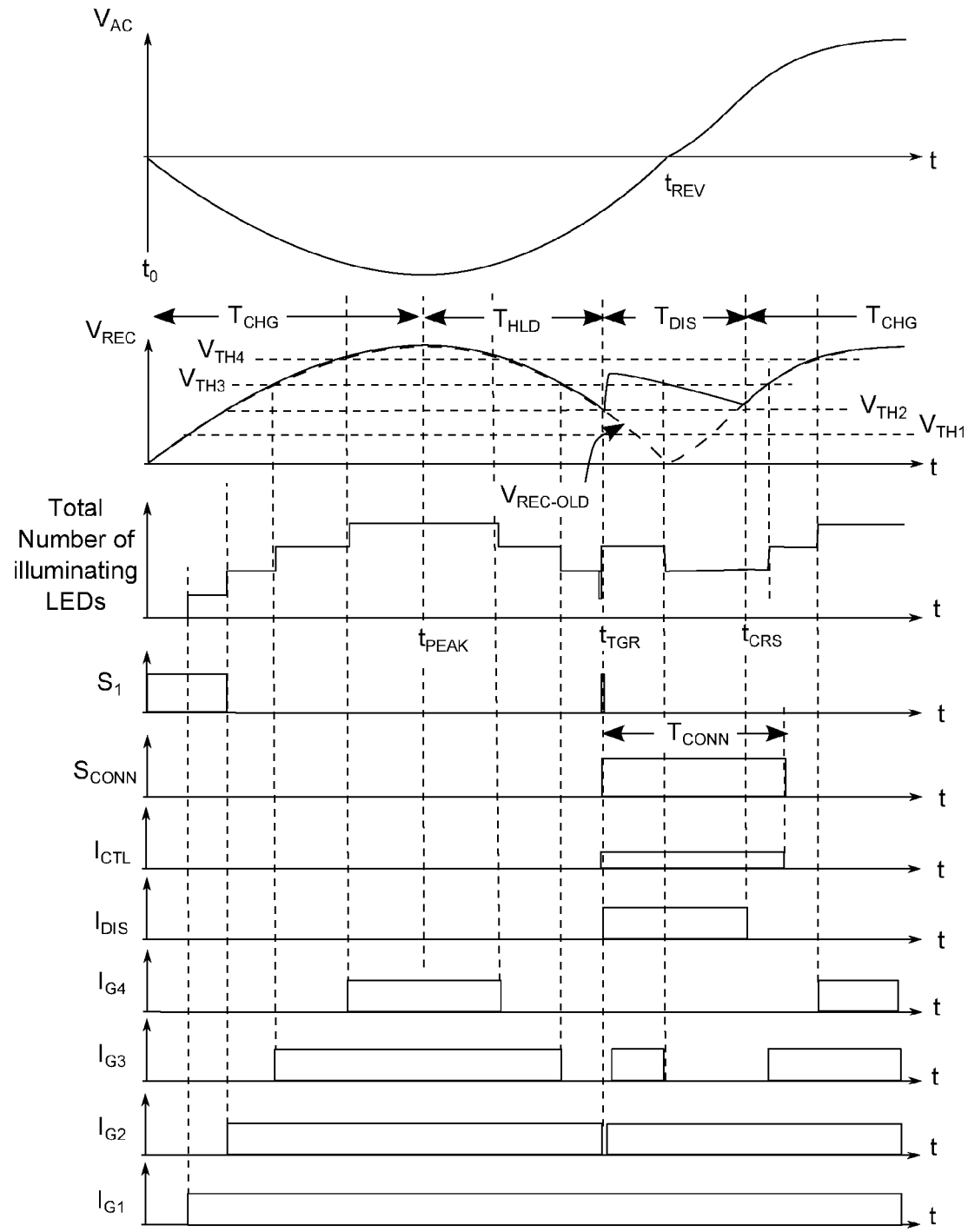
FIG. 5 demonstrates some waveforms of signals in FIG. 4.

FIG. 5 demonstrates some waveforms of signals in FIG. 4. The sinusoid input voltage $V_{AC}$ in FIG. 5 is negative during the time period between times $t_0$ and $t_{REV}$, and becomes positive after time $t_{REV}$. The time period from time $t_0$ to time $t_{PEAK}$ is called a charge period $T_{CHG}$ since the rectified input voltage $V_{REC}$ continuously increases, so the capacitor 112 is continuously charged through the diode 114 in FIG. 4. After the time $t_{PEAK}$ when the rectified input voltage $V_{REC}$ starts decreasing, the diode 114 is reversely biased and stops conducting. The discharge switch 110 in the meantime is turned OFF as the control current $I_{CTL}$ is about 0 A, such that the capacitor 112 holds electric energy until the time $t_{TGR}$, the moment the rectified input voltage $V_{REC}$ drops below the threshold voltage $V_{TH2}$, the voltage required for driving both the LED groups $20_1$ and $20_2$ to illuminate. The time period between the times $t_{PEAK}$ and $t_{TGR}$ is referred to as a holding time $T_{HLD}$ because the capacitor 112 constantly stores and holds the electric energy during this time period.

At the time $t_{TGR}$, as the rectified input voltage $V_{REC}$ drops below the threshold voltage $V_{TH2}$, the signal $S_1$ is asserted to turn the path switch $SG_1$ ON, trying to make the current $I_{G1}$ bypass the LED group $20_2$. The asserting of the signal $S_1$, nevertheless, triggers the pulse generator 108 in FIG. 4 to provide the pulse $S_{CONN}$, which as shown in FIG. 5 has a pulse width of a connection period $T_{CONN}$. During the connection period $T_{CONN}$, the control current $I_{CTL}$, as shown in FIG. 5, is a constant more than 0 A. The control current $I_{CTL}$ makes the BJT 110 in FIG. 4 conduct the discharge current $I_{DIS}$, so the capacitor 112 starts releasing its energy to illuminate the LED string, and the rectified input voltage $V_{REC}$ suddenly raises above the threshold voltage $V_{TH3}$ at time $t_{TGR}$, as shown in FIG. 5. Shown in FIG. 5 as a comparison to the waveform of the rectified input voltage $V_{REC}$ is a fictitious waveform $V_{REC\text{-}OLD}$ demonstrating the original rectified input voltage $V_{REC}$ without the help from the power bank 104. It is noted that the fictitious waveform $V_{REC\text{-}OLD}$, unlike the waveform of the rectified input voltage $V_{REC}$, continues dropping after the time $t_{TGR}$. Soon after time $t_{TGR}$, the signal $S_1$ is deasserted due to the sudden increase at the rectified input voltage $V_{REC}$, and that is the reason why the signal $S_1$ has a very narrow pulse at about the time $t_{TGR}$ in FIG. 5.

After time $t_{TGR}$, the capacitor 112 continues discharging, and the rectified input voltage $V_{REC}$ ramps down as the electric energy stored in the capacitor 112 is consumed. The discharging ends at time $t_{CRS}$, when the fictitious waveform $V_{REC\text{-}OLD}$, which also represents the absolute value of the sinusoid input voltage $V_{AC}$, merges with the rectified input voltage $V_{REC}$. The time period between times $t_{TGR}$ and $t_{CRS}$ is accordingly referred to as a discharge period $T_{DIS}$. Within the discharge period $T_{DIS}$, the total number of the illuminating LEDs reduces when the rectified input voltage $V_{REC}$ drops across the threshold voltage $V_{TH3}$. The duration of the discharge period $T_{DIS}$ depends on the amplitude of the sinusoid input voltage $V_{AC}$, the capacitance of the capacitor 112, and the magnitude of the discharge current $I_{DIS}$. For example, the more the capacitance of the capacitor 112, the longer the duration of the discharge period $T_{DIS}$. The discharge period $T_{DIS}$ is at most equal to the connection period $T_{CONN}$. The discharge period $T_{DIS}$ is the same as the connection period $T_{CONN}$ in condition that the rectified input voltage $V_{REC}$ is always higher than the absolute value of the AC sinusoidal input voltage $V_{AC}$ during the connection period $T_{CONN}$.

Another charge period $T_{CHG}$ starts at time $t_{CRS}$ since after that moment the rectified input voltage $V_{REC}$ increases to charge the capacitor 112.

Some embodiments of the invention have the connection period $T_{CONN}$ less than one third the cycle time of the sinusoid input voltage $V_{AC}$. For instance, the cycle time of the sinusoid input voltage $V_{AC}$ is 1/60 sec and the connection period $T_{CONN}$ is less than 1/180 sec. Preferably, the connection period $T_{CONN}$ is less than one quarter of the cycle time of the sinusoid input voltage $V_{AC}$.

Figure 1:
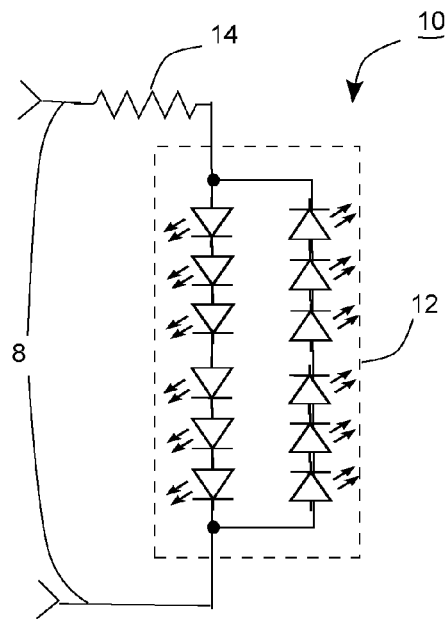
FIG. 1 demonstrates an AC LED lamp in the art.
Figure 2:
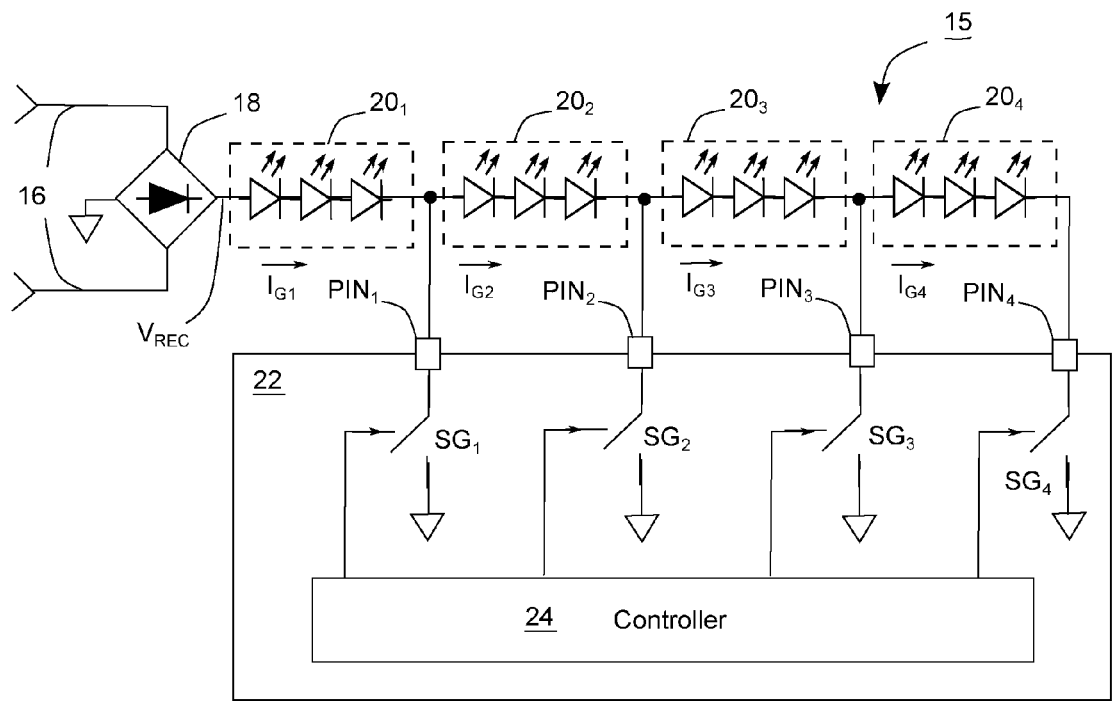
FIG. 2 demonstrates another AC LED lamp in the art.
Figure 3:
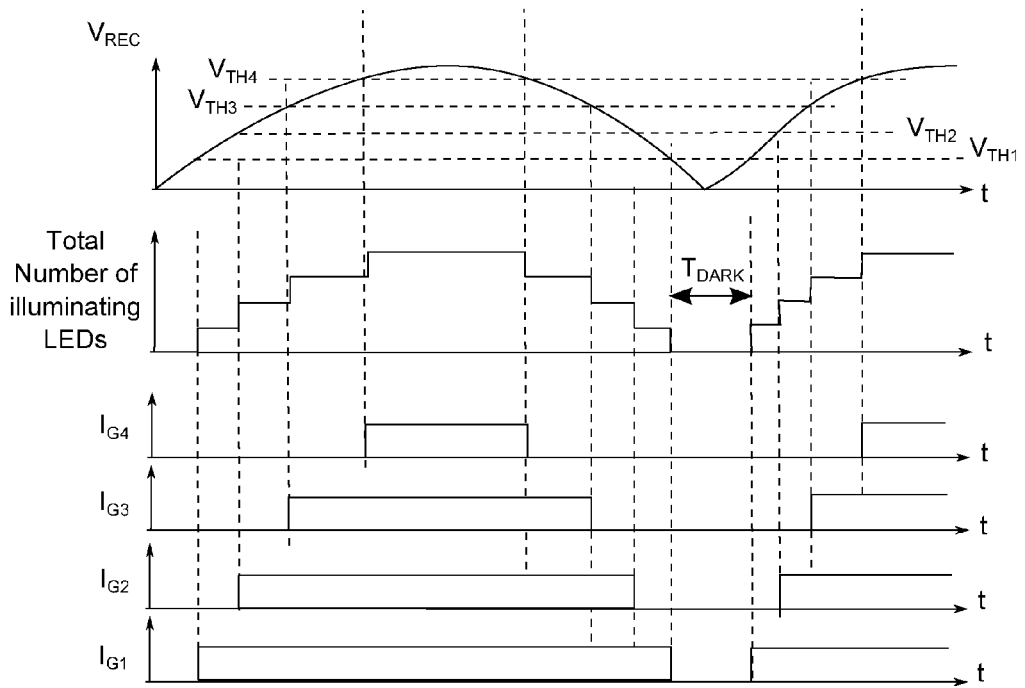
FIG. 3 illustrates the waveforms of signals when the input port in FIG. 2 is supplied with an AC sinusoidal input voltage.

Unlike FIG. 3, which demonstrates a dark period $T_{DARK}$ when no LED illuminates, FIG. 5 always has at least one LED group illuminating and introduces no dark period $T_{DARK}$. More particular, when the signal $S_1$ indicates the absolute value of the sinusoid input voltage $V_{AC}$ is not high enough to drive two LED groups ($20_1$ and $20_2$), the bank controller 106 responsively starts providing to the LED string the electric power stored in the capacitor 112, so at least one LED group in the LED string could continue illuminating, to avoid the occurrence of the dark period $T_{DARK}$.

The discharge current $I_{DIS}$ shown in FIG. 5 is a constant in magnitude over the discharge period $T_{DIS}$, but the invention is not limited to. For example, capable of being a replacement to the integrated circuit 102 of FIG. 4, the integrated circuit 160 in FIG. 6 according to one embodiment of the invention could cause the discharge current $I_{DIS}$ to increase over time during the discharge period $T_{DIS}$.

Figure 6:
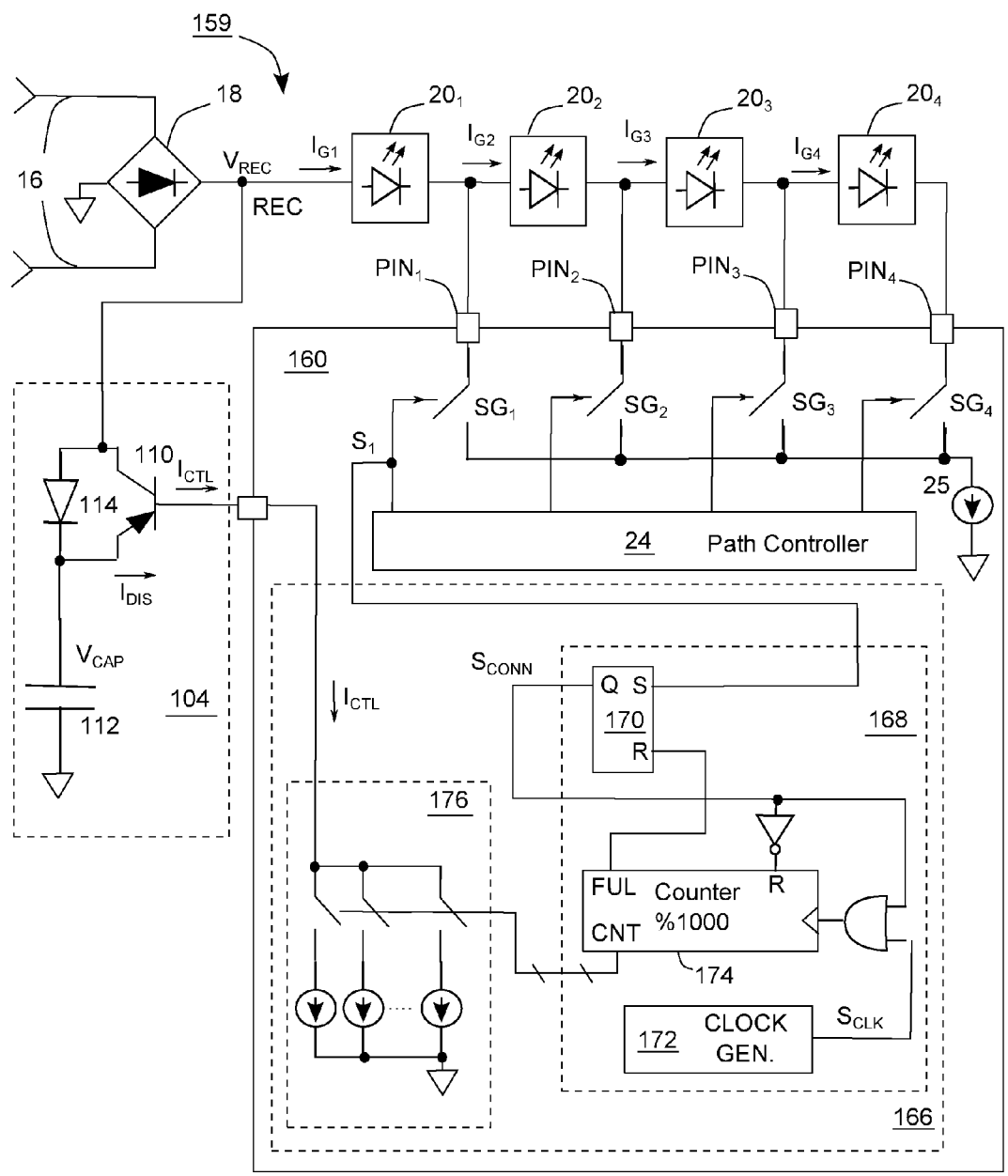
FIG. 6 demonstrates another AC LED lamp according to embodiments of the invention.

The integrated circuit 160 in FIG. 6 has, among others, a bank controller 166 with a pulse generator 168 and a digital-to-analog converter (ADC) 176. The pulse generator 168, as will be detailed soon, provides a pulse $S_{CONN}$ with a pulse width of a connection period $T_{CONN}$, in response to the asserting of the signal $S_1$. The pulse generator 168 further provides a digital count result, which is converted by the ADC 176 to generate the control current $I_{CTL}$, an analog result. As the digital count result increases over time during the connection period $T_{CONN}$, the control current $I_{CTL}$ increases over time, and so does the discharge current $I_{DIS}$.

Figure 7:
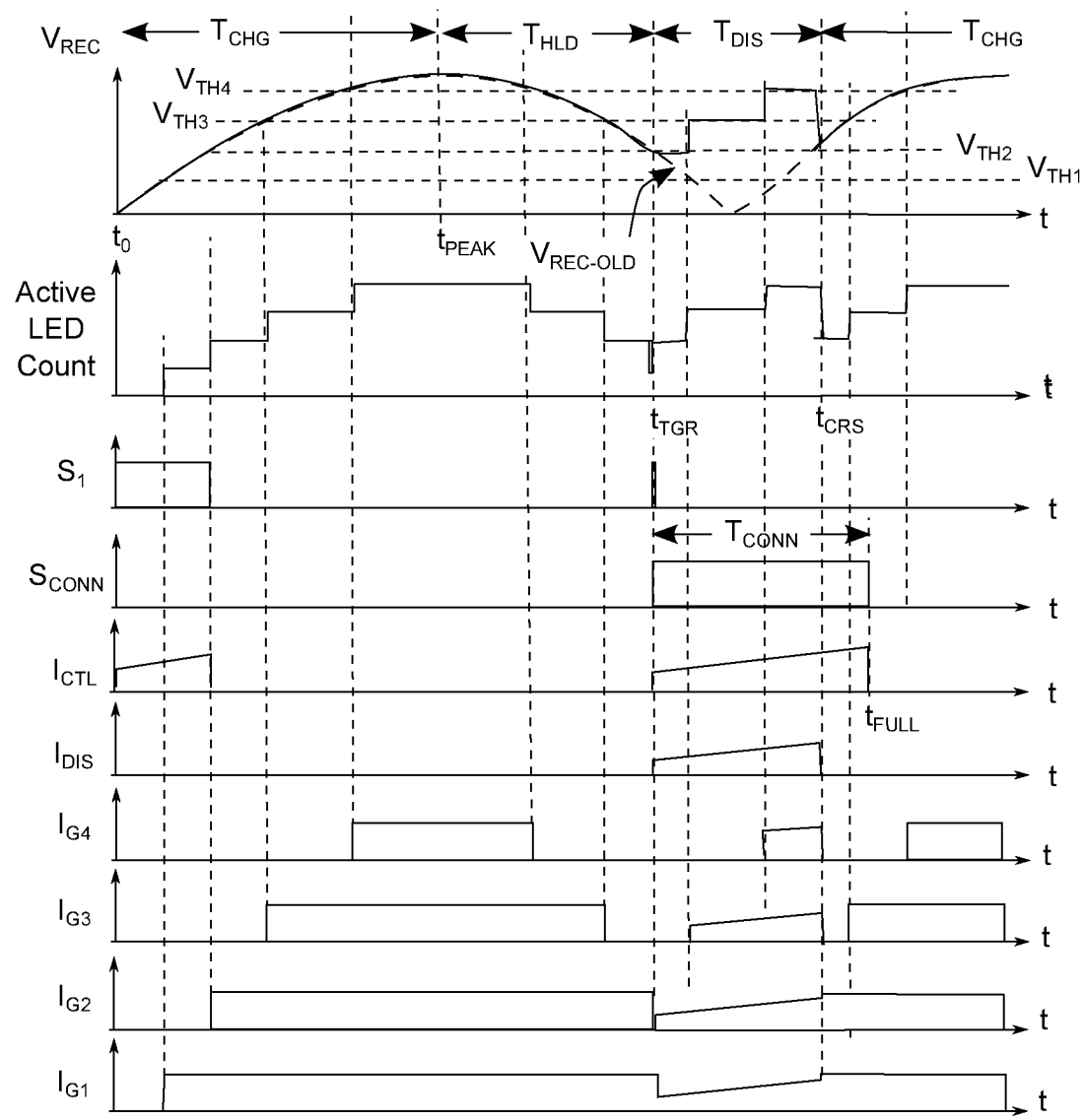
FIG. 7 demonstrates some waveforms of signals in FIG. 6.

Please refer to both FIGS. 6 and 7, where FIG. 7 demonstrates some waveforms of signals in FIG. 6. When the signal $S_1$ is asserted at time $t_{TGR}$, the SR flip-flop 170 is set to have logic "1" at its output Q, which also presents the pulse $S_{CONN}$. When the output Q is "1" in logic, the clock signal $S_{CLK}$ from the clock generator 172 can reach the clock input of the counter 174, and the clock counter accordingly counts to have its digital count result digitally increased. At time $t_{FULL}$ in FIG. 7 when the digital count result reaches a predetermined number, 1000 for example, the counter 174 resets the SR flip-flop 170 and the Q output of the SR flip-flop 170 becomes "0" in logic to reset the counter 174, concluding the pulse $S_{CONN}$. In this example, the pulse $S_{CONN}$ at the output Q of the SR flip-flop 170, as shown in FIG. 7, has a pulse width, or the connection period $T_{CONN}$, about 1000 clock cycles (of the clock signal $S_{CLK}$). In FIG. 6, the digital count result of the counter 174 is fed to the ADC 176 to generate the control current $I_{CTL}$, which ramps upward over time during the connection period $T_{CONN}$ as the digital count result increases. The discharge current $I_{DIS}$, which the BJT 110 provides by amplifying the control current $I_{CTL}$, increases over time in the beginning portion of the connection period $T_{CONN}$, but drops to zero at time $t_{CRS}$ when the waveform $V_{REC-OLD}$ has merged with the rectified input voltage $V_{REC}$. In the embodiment of FIGS. 6 and 7, during the connection period $T_{CONN}$, the discharge current $I_{DIS}$ through the BJT 110 to the node REC is always less than the maximum driving current the current source 25 is designed to drain, as shown by the waveforms of currents $I_{G1}$, $I_{G2}$, $I_{G3}$, and $I_{G4}$. As derivable from FIG. 7, a lot of the capacitor voltage $V_{CAP}$ on the capacitor 112, which is intentionally prepared for driving the LED string, would be consumed by the BJT 25, and accordingly the active LED count increases over time during the discharge period $T_{DIS}$ since the effective resistance of the BJT reduces as the discharge current $I_{DIS}$ ramps up. This phenomenon is very different from what is shown in FIG. 5, where the active LED count decreases over time during the discharge period $T_{DIS}$.

The embodiment shown in FIGS. 6 and 7 is not for limiting the scope of the invention. Since the current source 25 always limits the current through any one of the LED groups $20_1$, $20_2$, $20_3$ and $20_4$, the discharge current $I_{DIS}$ through the BJT 110 to the node REC, which is constant or varies, could be equal to or less than the maximum driving current the current source 25 is designed to drain. For example, if the current gain of the BJT 110 is very large, the BJT 110 could perform a short circuit during the discharge period $T_{DIS}$ as the discharge current $I_{DIS}$ is limited by the current source 25, and the number of the LED groups that emit light decreases as long as the energy stored by the capacitor 112 is continuously consumed, an example result of which is shown in FIG. 5. In the opposite, if the current gain of the BJT 110 is relatively small, the BJT 110 could replace the role of the current source 25, and limit the current through any of the LED groups during the discharge period $T_{DIS}$. In this case, the number of the LED groups emit light could increase if the voltage drop across the BJT 110 is reduced due to the increase of the discharge current $I_{DIS}$, as exemplified by FIG. 7.

Figure 8:
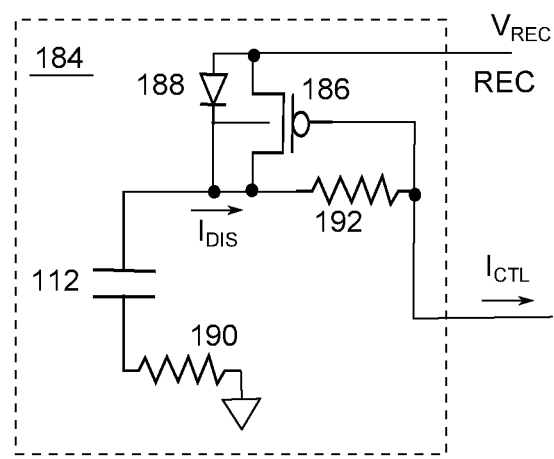
FIG. 8 demonstrates another power bank.

FIG. 8 demonstrates another power bank 184, an alternative to the power bank 104 in FIG. 4 or 6. Instead of using a BJT as a discharge switch, the power bank uses a P-type MOSFET 186. Moreover, the power bank 184 lacks the diode 114 in FIG. 4, which provides a charge path for charging the capacitor 112. During a charge period $T_{CHG}$, the capacitor 112 could be charged via a parasitic body diode 188 in the P-type MOSFET 186. During a discharge period $T_{DIS}$, the control current $I_{CTL}$ could cause a voltage drop across the resistor 192, and this voltage drop acts as the required gate bias to turn on the P-type MOSFET 186, such that the capacitor 112 releases its stored energy to the node REC. The resistor 190 connected to the capacitor 112 in FIG. 8 is used to limit the maximum current charging or discharging the capacitor 112.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LED lamp, comprising:
   LED groups arranged in series between a rectified input voltage and a ground voltage;
   a path controller configured to control path switches, each path switch for coupling a corresponding LED group to the ground voltage;
   a power bank coupled between the rectified input voltage and the ground voltage, comprising:
      a capacitor configured to be charged when the rectified input voltage exceeds a capacitor voltage of the capacitor; and
      a discharge switch connected between the capacitor and the rectified input voltage; and
   a bank controller, configured for determining a connection period and controlling the discharge switch in response to a signal turning ON one of path switches, in order to make the capacitor capable of being discharged to the rectified input voltage during the connection period, the bank controller comprising a pulse generator for generating a pulse with a pulse width of the connection period, the pulse generator comprising:
      a counter with a clock input; and
      a clock generator for providing a clock signal;
   wherein the counter counts based on the clock signal during the connection period, and the connection period ends when a count result of the counter reaches a predetermined number.

2. The LED lamp of claim 1, wherein the bank controller controls the discharge switch to provide a constant discharge current from the capacitor to the rectified input voltage during a discharge period within the connection period.

3. The LED lamp of claim 1, wherein the bank controller controls the discharge switch to provide a discharge current from the capacitor to the rectified input voltage, and the discharge current increases over time during a discharge period within the connection period.

4. The LED lamp of claim 1, wherein the bank controller is in response to a signal controlling the most upstream path switch that is for coupling the most upstream LED group to the ground voltage.

5. The LED lamp of claim 1, wherein the discharge switch is a BJT.

6. The LED lamp of claim 5, wherein the bank controller drains a control current from a base of the BJT during the connection period.

7. The LED lamp of claim 6, wherein the control current is a constant or increases over time during the connection period.

8. The LED lamp of claim 1, wherein the discharge switch is a MOSFET.

9. A method for eliminating a dark zone when LED groups arranged in series between a rectified input voltage and a ground voltage generated by rectifying an AC input voltage, the method comprising:
provinding path switches, each path switch for coupling a corresponding LED group to the ground voltage;
charging a capacitor when the rectified input voltage exceeds a capacitor voltage of the capacitor;
providing a clock generator to generating a clock signal;
in response to a signal turning ON one of path switches, determining a connection period and starting to count based on the clock signal;
making the capacitor capable of being discharged to the rectified input voltage during the connection period; and
ending the connection period when a count result reaches a predetermined number.

10. The method of claim 9, further comprising:
providing a discharge switch connected between the capacitor and the rectified input voltage; and
discharging the capacitor to the rectified input voltage, via the discharge switch, during a discharge period with the connection period.

11. The method of claim 10, further comprising:
generating a constant discharge current through the discharge switch during the discharge period.

12. The method of claim 10, further comprising:
generating a discharge current through the discharge switch during the discharge period;
wherein the discharge current increases over time.

13. The method of claim 10, wherein the discharge switch is a BJT.

14. The method of claim 13, further comprising:
draining a control current from a base of the BJT during the connection period;
wherein the control current is a constant or increases over time.

15. The method of claim 10, wherein the discharge switch is a MOSFET.

16. A method for eliminating a dark zone when LED groups arranged in series between a rectified input voltage and a ground voltage generated by rectifying an AC input voltage, the method comprising:
providing path switches, each path switch for coupling a corresponding LED group to the ground voltage;
providing a current source connected to the path switches, for limiting a maximum driving current through the LED groups;
charging a capacitor when the rectified input voltage exceeds a capacitor voltage of the capacitor;
in response to a signal turning ON one of path switches, determining a connection period;
providing a discharge switch connected between the capacitor and the rectified input voltage; and
discharging the capacitor to the rectified input voltage, via the discharge switch, during a discharge period with the connection period;
wherein, during the discharge period, a discharge current from the capacitor, through the discharge switch and to the rectified input voltage, is always less than the maximum driving current.

17. The method of claim 16, further comprising: generating a pulse with a pulse width of the connection period.

* * * * *